United States Patent [19]

Beach et al.

[11] 4,329,255
[45] May 11, 1982

[54] CATALYST COMPOSITION

[75] Inventors: David L. Beach, Gibsonia; Richard W. Lunden, Pittsburgh, both of Pa.; Adolfo Zambelli, Milan, Italy

[73] Assignee: Gulf Research & Development Company, Pittsburgh, Pa.

[21] Appl. No.: 220,315

[22] Filed: Dec. 29, 1980

[51] Int. Cl.$^3$ .............................................. C08F 4/64
[52] U.S. Cl. ................................. 252/429 B; 526/119
[58] Field of Search ....................... 252/429 B, 429 C

[56] References Cited

U.S. PATENT DOCUMENTS 3,901,863 8/1975 Berger et al. ................. 252/429 CX
4,021,599 5/1977 Kochhar et al. ............. 252/429 BX Primary Examiner—Patrick Garvin
Attorney, Agent, or Firm—Deane E. Keith; Forrest D. Stine; Joseph J. Carducci

[57] ABSTRACT

A novel catalyst system comprising (A) the solid product obtained by (1) treating a polymeric support carrying a magnesium compound with a titanium halide and (2) reacting the product of (1) with an aluminum hydrocarbyl; (B) an activator; and (C) at least one non-halide-containing organic oxygenated titanium compound.

30 Claims, No Drawings

CATALYST COMPOSITION

BACKGROUND OF THE INVENTION

1. Field of the Invention

This invention relates to a novel catalyst system comprising (A) the solid product obtained by (1) treating a polymeric support carrying a magnesium compound with a titanium halide and (2) reacting the product of (1) with an aluminum hydrocarbyl; (B) an activator; and (C) at least one non-halide-containing organic oxygenated titanium compound.

2. Description of the Prior Art

In U.S. Pat. No. 4,021,599 to Kochhar et al there is disclosed a catalyst composition component produced by (1) suspending a finely-divided polymeric support, such as polyethylene, in an alkanol solution of a magnesium compound, such as magnesium chloride, (2) vaporizing the alkanol to deposit the magnesium compound on the support, (3) treating the magnesium impregnated support with a transition metal halide, such as titanium tetrachloride, in a hydrocarbon medium and (4) reacting the product of (3) with an organometallic compound, such as triethylaluminum.

SUMMARY OF THE INVENTION

We have found that if we add a critical amount of at least one non-halide-containing organic oxygenated compound to a catalyst system comprising (A) the solid product obtained by (1) treating a polymeric support carrying a magnesium compound with a titanium halide and (2) reacting the product of (1) with an aluminum hydrocarbyl and (B) an activator, the resulting catalyst composition can effectively be used to polymerize ethylene to obtain a polyethylene having significant chain branching.

The polymeric support carrying the magnesium compound that is reacted with the titanium halide can be obtained in any suitable manner, for example, by intimately mixing the polymeric support and the solid magnesium compound, by sublimation of the magnesium compound onto the polymeric support, etc. However, the procedure employed by Kochhar et al, referred to above, for preparing the polymeric support carrying the magnesium compound is preferred. In fact, in preparing the solid product, Component (A), of our novel catalyst system, the same polymeric supports, magnesium compounds, titanium halides and aluminum hydrocarbyls used by Kochhar et al, including the same procedure, can also be used herein. Thus, the polymeric support can be either an organic thermoplastic polymer or an organo thermoset polymer, particularly in a finely-divided particulate form, having at least one dimension not exceeding about 600 microns but generally falling within the range of about one to about 200 microns. The polymeric support can assume any desired shape, such as spheres, rods, cylinders, etc. Suitable polymeric supports include poly(triallylyisocyanurate), polyethylene polypropylene, poly(3-methylbutene), poly(4-methylpentene), polyamides, polyesters, polyacrylamides, polyacrylonitriles, polycarbonates, cellulose, etc. Of these polyethylene is preferred, particularly the polyethylene obtained by polymerizing ethylene using the novel catalyst herein.

The magnesium component can be defined, for example, by the following formula:

$$MgX_2 \cdot nH_2O,$$

wherein X can be an anion which imparts solubility of at least one weight percent in any suitable polar solvent, for example, an alkanol or an ether, defined hereinbelow, and n is a number from 1 to 6. Thus X can be a halogen (chlorine, fluorine, bromine or iodine) or nitrate; $-OC(R_1)_3$ or $-OCH_2OC(R_2)_3$, wherein $R_1$ and $R_2$ can be a hydrocarbyl radical, such as an alkyl radical having from one to 20 carbon atoms, or hydrogen; —OCOH; etc. Thus, mention can be made of the following compounds of magnesium: (1) the halides thereof; (2) the nitrates thereof; (3) the alkoxides thereof, such as methylates, ethylates, isopropylates, n-butylates, isobutylates, methoxyethylates, hydroxymethylates, etc.; (4) the phenates thereof, such as salts of phenic acid, naphthenes, anthracenates, phenanthrenates, cresolates, etc.; (5) the carboxylates thereof, such as acetates, butanoates, laurates, pivolates, crotonates, phenylacetates, benzoates, malonates, adipates, sebacates, phthalates, mellitates, acrylates, oleates, maleates, etc., the acetylacetonates; etc. Of these, we prefer the magnesium halides, particularly magnesium dichloride. Specific examples of such magnesium compounds suitable herein include magnesium dichloride, magnesium dibromide, magnesium diiodide, magnesium nitrate, magnesium methoxide, magnesium ethoxide, magnesium n-propoxide, magnesium iso-propoxide, magnesium n-butoxide, magnesium iso-butoxide, magnesium sec-butoxide, magnesium t-butoxide, magnesium pentoxide, magnesium phenoxide, magnesium naphthenate, magnesium anthracenate, magnesium phenanthrenate, magnesium o-cresolate, magnesium m-cresolate, magnesium p-cresolate, magnesium acetate, magnesium phenylacetate, magnesium benzoate, magnesium butanoate, magnesium laurate, magnesium pivalate, magnesium crotonate, magnesium malonate, magnesium adipate, magnesium sebacate, magnesium phthalate, magnesium millitate, magnesium acrylate, magnesium oleate, magnesium maleate, magnesium gluconate, magnesium salicylate, magnesium cyclohexanebutyrate, magnesium stearate, magnesium acetylacetonate, magnesium 8-hydroxyquinoline, etc., and mixtures thereof. Of these we prefer to use the magnesium halides, especially magnesium dichloride.

The alkanol used in suspending the polymeric support can be any alkanol having from one to six carbon atoms, preferably from one to four carbon atoms, such as methanol, ethanol, isopropanol, n-propanol, n-butanol, sec-butanol, isobutanol, t-butanol, n-pentanol, n-hexanol, ethylene glycol, propanediol, 1,4-butanediol, etc. Of these we prefer to use to use methanol and ethanol. Any suitable ether, preferably an alkyl ether having from two to eight carbon atoms, preferably from two to four carbon atoms, such as dimethyl ether, diethyl ether, methylethyl ether, di-n-propyl ether, diisopropyl ether, methylisopropyl ether, di-n-butyl ether, diisobutyl ether, ethylbutyl ether,, can similarly be used. In fact any suitable polar solvent, as hereinabove defined, can be used.

Any titanium halide soluble in a hydrocarbon solvent can be used to prepare the solid product, Component (A), such as titanium tetrachloride and titanium tetrabromide. Of these we prefer to use titanium tetrachloride.

The activator, Component (B) can include organic compounds of aluminum or magnesium. As examples of such compounds, those falling within the following formulae:

AlR$_3$R$_4$R$_5$ and

MgR$_6$R$_7$ can be used. In the above R$_3$, R$_4$, R$_5$, R$_6$ and R$_7$, the same or different, are hydrocarbyl radicals selected from the group consisting of saturated or unsaturated, straight or branched chain alkyl radicals having from one to 24 carbon atoms, preferably from one to 10 carbon atoms, aryl radicals having from six to 20 carbon atoms, preferably from six to 10 carbon atoms, alkenyl radicals having from one to 30 carbon atoms, preferably from one to 20 carbon atoms, cycloalkyl radicals having from three to 40 carbon atoms, preferably from three to 30 carbon atoms, and aralkyl and alkyaryl radicals having from six to 40 carbon atoms, preferably from six to 30 carbon atoms. Of these we prefer to use the organic compounds of aluminum. Specific examples of such compounds include trimethylaluminum, triethylaluminum, tri-n-propylaluminum, tri-iso-propylaluminum, tri-n-butylaluminum, tri-sec-butylaluminum, tri-iso-butylaluminum, trihexylaluminum, diethylbutylaluminum, tricyclohexylaluminum, trioctylaluminum, tri(2-methylpentyl)aluminum, triisopropylaluminum, tribenzylaluminum, phenydiethylaluminum, diethylmagnesium, di-n-propylmagnesium, di-iso-propylmagnesium, di-n-butylmagnesium, di-sec-butylmagnesium, di-iso-butylmagnesium, dihexylmagnesium, dicyclohexylmagnesium, ethylbutylmagnesium, diphenylmagnesium, dibenzylmagnesium, etc., and mixtures thereof.

In preparing solid product Component (A) the amounts of individual components used and the procedure employed can be the same or similar to that defined in the Kochhar et al patent. Thus, in the first step, the magnesium can be dissolved in the defined solvent, for example one of the defined alkanols or ethers, so that its concentration therein can be, for example, in the range of about one to about 70 weight percent, generally in the range of about 10 to about 50 weight percent. The weight percent of the polymeric support suspended in the solvent can be in the range of about five to about 50 weight percent, generally about 10 to about 25 weight percent.

After the above has been thoroughly mixed, the solvent is removed therefrom by any suitable means, for example, by filtration or by vaporization or by gently heating at ambient pressure or under vacuum and at a temperature of about 15° to about 150° C. so as to deposit the magnesium compound uniformly over the polymeric support. The polymeric support so obtained can carry from about 0.5 to about 60 weight percent, generally from about 10 to about 20 weight percent, of the magnesium compound, based on the combined weight of the polymeric support and the magnesium compound.

The polymeric support carrying the magnesium compound obtained above, or obtained in any suitable manner, as previously described, is then suspended in a suitable liquid hydrocarbon, for example, isobutane, n-pentane, n-heptane, cyclohexane, benzene, toluene, etc., and to the resulting slurry there is added the defined titanium halide. The amount of titanium halide can vary over a wide range, for example, the molar ratio thereof relative to the magnesium compound can be in the range of about 1:100 to about 1:2, preferably in the range of about 3:100 to about 1:10. To effect reaction between the magnesium compound and the titanium compound the slurry is simply mixed, for example, at a temperature of about 20° to about 150° C., preferably about 25° C., and a pressure of about 14 to about 100 pounds per square inch gauge (about 96.5 to about 689.5 kPa), preferably atmospheric pressure (ambient pressure), for about 10 minutes to about six hours, preferably about 30 minutes to about two hours.

The resulting product is then further reacted with an aluminum hydrocarbyl compound, which can be defined in accordance with the definition made hereinabove in respect to activator (B). The amount of aluminum hydrocarbyl used in such reaction can be varied over a wide range and the molar ratio thereof relative to the titanium compound previously used can be, for example, in the range of about 1:1 to about 200:1, generally in the range of about 10:1 to about 50:1. The conditions under which the reaction between the magnesium compound and the titanium compound were carried out can also be used in the latter reaction.

In preparing the novel catalysts herein there is added to the solid product Component (A) and to activator Component (B) a selected critical amount of a non-halide-containing organic oxygenated titanium compound, such as, for example, those falling within the following formula:

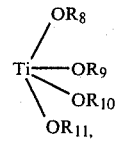

wherein R$_6$, R$_7$, R$_8$ and R$_9$, the same or different, can be a hydrocarbyl radical, such as defined above with reference to the organic compounds of aluminum and magnesium. Specific examples of such titanium compounds include titanium tetra (alkoxides), such as titanium tetra(methoxide), titanium tetra (ethoxide), titanium tetra(n-propoxide), titanium tetra(isopropoxide), titanium tetra(n-butoxide), titanium tetra(isobutoxide), titanium tetra(sec-butoxide), titanium tetra(t-butoxide), titanium tetra(pentoxide), etc.; titanium tetra (phenoxide), etc., and mixtures thereof.

In order to obtain the novel catalyst composition defined and claimed herein, it is critical that the molar ratios of the added non-halide-containing organic oxygenated titanium compound and of the titanium compound used to prepare solid product Component (A) be in the range of about 5:1 to about 50:1, preferably in the range of about 10:1 to about 30:1. The novel catalyst system is simply prepared by physical admixture of Components (A), (B) and added Component (C), that is, the non-halide-containing organic oxygenated titanium compound, in any desirable order.

The novel catalyst system is useful in the polymerization of olefins having a terminal unsaturation whose molecules contain from two to 20 carbon atoms, such as ethylene, propylene, butene-1, 4-methylpentene-1, hexene-1, decene-1, hexadecene-1, etc., but particularly ethylene.

The polymerization of olefins using the novel catalyst herein can be carried out using any known or conventional procedure used for the polymerization of olefins, for example, the procedure of Kochhar et al. Thus, the polymerization can be carried out in solution, suspension or in a gaseous phase wherein the olefinic, for example, ethylenic, partial pressure can be in the range of about 14 to about 2000 pounds per square inch gauge (about 96.5 to about 13,790 kPa), preferably in the range of about 100 to about 1000 pounds per square inch gauge (about 689 to about 6895 kPa), and a temperature in the range of about 20° to about 250° C., preferably in the range of about 50° to about 120° C., over a period of about 0.5 to about six, preferably about two to about four, hours, if the reaction is carried out as a batch process. Additionally, if desired, the reaction can be carried out continuously using the same reaction conditions.

Although the molar ratio of the added titanium in Component (C) to the titanium in Component (A) is critical, as pointed out above, the amount of catalyst used is not critical. Thus, the concentration of the catalyst composition in the polymerization zone can be maintained in the range of about 0.001 to about 20, preferably about 0.01 to about 10, grams per liter of reactor volume.

The polymerization reaction herein can be carried out in the additional presence of hydrogen, wherein its partial pressure can be in the range of about 10 to about 500 pounds per square inch gauge (about 69 to about 3448 kPa), preferably in the range of about 20 to about 250 pounds per square inch gauge (about 138 to about 1724 kPa).

The recovery of the olefinic polymer and the removal of carrier and catalyst residue therefrom can be effected following any conventional procedure. Thus, the carrier can be flashed from the reaction product and the latter can then be washed with a suitable solvent, such as methanol, to remove catalyst residue, if desired.

The process for polymerizing ethylene using the novel catalyst composition herein is claimed in our copending application Ser. No. 220,293, entitled Process for Polymerizing Ethylene filed concurrently herewith.

DESCRIPTION OF PREFERRED EMBODIMENTS

Several runs were carried out as follows. A solid reaction product was prepared by suspending particulate polyethylene in methanol, wherein there had been dissolved magnesium dichloride, removing methanol from the suspension by vaporization and treating the resulting product with a hydrocarbon solution of titanium tetrachloride and subsequently with triethylaluminum following the procedure of Example 1 in U.S. Pat. No. 4,021,599 to Kochhar et al, referred to above. The solid reaction product so prepared was analyzed and found to contain 3.95 weight percent of elemental titanium, 1.50 weight percent of elemental magnesium, 7.09 weight percent of elemental chlorine and 1.91 weight percent of elemental aluminum. An approximately 100-milligram portion of the solid reaction product so obtained, together with triethylaluminum, was used to polymerize ethylene in Example I. Similar amounts of the solid reaction product, together with triethylaluminum, and varying amounts of titanium tetra(isopropoxide) were used in Examples III to VII, inclusive, to polymerize ethylene. An additional run was made (Example II) in which a catalyst system containing 0.3 milliliter of titanium tetra(isopropoxide) and 2.5 milliliters of triethylaluminum was also used to polymerize ethylene.

The polymerization reactions were carried out as follows. In Example I there was added to 22.5 milliliters of dry n-heptane 2.5 milliliters of triethylaluminum and the solid reaction product prepared above, while in each of Examples III to VII, inclusive, there was also added varying amounts of titanium tetra(isopropoxide). In Example II only the triethylaluminum and titanium tetra(isopropoxide) were added to the dry n-heptane. In each case the resulting mixture was introduced under vacuum into a one-liter autoclave maintained at 50° C. and stirred pneumatically. The autoclave was then pressured with ethylene alone in Example II and with ethylene and hydrogen in Examples I and III to VII, inclusive, and the reaction was permitted to continue while keeping the pressure constant by further addition of ethylene as needed. At the end of the reaction period the autoclave was then pressured and the reaction product stirred into one liter of isopropyl alcohol acidified to a pH of about 1.0 with hydrochloric acid. The solid polyethylene obtained was filtered off, washed with methanol and dried at 70° C. under vacuum. The results obtained are tabulated below in Table I.

TABLE I

| Example | I | II | III | IV | V | VI | VII |
|---|---|---|---|---|---|---|---|
| Catalyst System | | | | | | | |
| Solid Reaction Product, Gms. | 0.098 | 0 | 0.100 | 0.105 | 0.098 | 0.100 | 0.101 |
| Titanium In Solid Reaction Product, Millimols (mm) | 0.08 | 0 | 0.0825 | 0.0866 | 0.081 | 0.0825 | 0.0833 |
| Titanium tetra(isopropoxide) Added, Milliliters (ml) | 0 | 0.3 | 0.1 | 0.3 | 0.5 | 0.7 | 0.8 |
| Titanium Added, mm | 0 | 0.01 | 0.336 | 1.01 | 1.68 | 2.35 | 2.69 |
| Mol Ratio Titanium Added to Titanium In Reaction Product | 0 | ∞ | 4.1 | 11.6 | 20.7 | 28.5 | 32.3 |
| Triethylaluminum, ml | 2.5 | 2.5 | 2.5 | 2.5 | 2.5 | 2.5 | 2.5 |
| Reaction Conditions | | | | | | | |
| Ethylene Partial Pressure, PSIG | 50 | 90 | 50 | 50 | 50 | 50 | 50 |
| Hydrogen Partial Pressure, PSIG | 40 | 0 | 40 | 40 | 40 | 40 | 40 |
| Reaction Temperature, °C. | 52 | 50 | 52 | 52 | 52 | 52 | 52 |
| Total Reaction Time, Hours | 2 | 3 | 2 | 2 | 1.5 | 1.25 | 1.4 |
| Polymer Yield, Grams of Polyethylene Per Gram | | | | | | | |

TABLE I-continued

| Example | I | II | III | IV | V | VI | VII |
|---|---|---|---|---|---|---|---|
| of Titanium in Solid Reaction Product Per Hour | 1795 | 8 | 1848 | 3014 | 3944 | 2430 | 1937 |
| Branches On Polyethylene Per 1000 Carbon Atoms | 0 | 11 | 8 | 29 | 57 | 96 | 89 |
| Intrinsic Viscosity, Tetralin, 135° C. | 2.147 | 4.652 | 1.806 | 1.401 | 1.794 | Not taken | 1.578 |

The data in Table I clearly show the improvement obtained by the addition of selected amounts of a non-halide-containing organic oxygenated titanium compound to a catalyst system containing (A) the solid product obtained by (1) treating a polymeric support carrying a magnesium compound with a titanium halide and (2) reacting the product of (1) with an aluminum hydrocarbyl and (B) an activator. Thus in Example I when a catalyst system containing only Components (A) and (B) were employed to polymerize ethylene, the polyethylene obtained was totally free of branching. When some titanium tetra(isopropoxide) was added to the system in Example III there was a slight increase in branching in the polyethylene product. However, when in each of Examples IV to VII, inclusive the amount of the added titanium to the titanium in the solid reaction product was such that the molar ratios were in excess of about 5:1, a significant increase in branching was observed in the polyethylene product. That the presence of titanium tetra(isopropoxide) in the absence of the solid reaction product will not give rise to significant branching in the polyethylene product is apparent from Example II wherein only eleven branches were observed per 1000 carbon atoms on the product polyethylene.

Obviously, many modifications and variations of the invention, as hereinabove set forth, can be made without departing from the spirit and scope thereof, and, therefore, only such limitations should be imposed as are indicated in the appended claims.

We claim:

1. A novel catalyst system comprising (A) the solid product obtained by (1) treating a polymeric support carrying a magnesium compound selected from the group consisting of magnesium halides, magnesium nitrates, magnesium alkoxides, magnesium phenates and magnesium carboxylates with a titanium halide and (2) reacting the product of (1) with an aluminum hydrocarbyl; (B) an activator selected from the group consisting of aluminum hydrocarbyls and magnesium hydrocarbyls; and (C) at least one non-halide-containing organic oxygenated titanium compound selected from the group consisting of titanium alkoxides and titanium phenoxides, wherein the molar ratio of titanium in Component C to titanium in Component A is in the range of about 5:1 to about 50:1.

2. The composition of claim 1 wherein said polymeric support is an organic thermoplastic polymer.

3. The composition of claim 1 wherein said polymeric support is an organic thermoset polymer.

4. The composition of claim 1 wherein said polymeric support is polyethylene.

5. The composition of claim 1 wherein said polymeric support is polyethylene obtained by polymerizing ethylene using the novel catalyst of claim 1.

6. The composition of claim 1 wherein said magnesium compound is a magnesium halide.

7. The composition of claim 1 wherein said magnesium compound is a magnesium nitrate.

8. The composition of claim 1 wherein said magnesium compound is a magnesium alkoxide.

9. The composition of claim 1 wherein said magnesium compound is a magnesium phenate.

10. The composition of claim 1 wherein said magnesium compound is a magnesium carboxylate.

11. The composition of claim 1 wherein said magnesium compound is defined by the following formula:

$$MgX_2 \cdot nH_2O,$$

wherein X can be a halogen, nitrate, $-OC(R_1)_3$ or $-OCH_2OC(R_2)_3$, wherein $R_1$ and $R_2$ can be a hydrocarbyl radical or hydrogen, or $-OCOH$, and n is a number from 1 to 6.

12. The composition of claim 6 wherein X can be a halogen.

13. The composition of claim 1 wherein said magnesium compound is magnesium dichloride.

14. The composition of claim 1 wherein said titanium halide is titanium tetrachloride.

15. The composition of claim 1 wherein said titanium halide is titanium tetrabromide.

16. The composition of claim 1 wherein said aluminum hydrocarbyl is an alkylaluminum.

17. The composition of claim 1 wherein said aluminum hydrocarbyl is triethylaluminum.

18. The composition of claim 1 wherein said activator is an aluminum hydrocarbyl.

19. The composition of claim 1 wherein said activator is a magnesium hydrocarbyl.

20. The composition of claim 1 wherein said activator is an alkylaluminum.

21. The composition of claim 1 wherein said activator is triethylaluminum.

22. The composition of claim 1 wherein said polymeric support carrying said magnesium compound is prepared by suspending a polymeric support in a polar solvent solution of said magnesium compound and thereafter removing said polar solvent therefrom.

23. The composition of claim 1 wherein said polar solvent is an alkanol.

24. The composition of claim 1 wherein Component (C) is a titanium compound defined by the following formula:

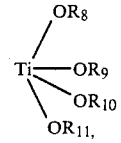

wherein R is a hydrocarbyl radical.

25. The composition of claim 1 wherein Component (C) is a titanium alkoxide.

26. The composition of claim 1 wherein Component (C) is titanium tetra(isopropoxide).

27. The composition of claim 1 wherein the magnesium compound is a magnesium halide, the aluminum hydrocarbyl is an alkylaluminum, the activator is an alkylaluminum and Component (C) is a titanium alkoxide.

28. The composition of claim 1 wherein Component (C) is a titanium phenoxide.

29. The composition of claim 1 wherein the magnesium compound is magnesium dichloride, the aluminum hydrocarbyl is triethylaluminum, the activator is triethylaluminum and Component (C) is titanium tetra(isopropoxide).

30. The composition of claim 1 wherein the molar ratio of titanium in Component (C) to the titanium in Component (A) is in the range of about 10:1 to about 50:1.

* * * * *